H. FRITZ.
Electric Battery.
No. 63,032. Patented March 19, 1867.
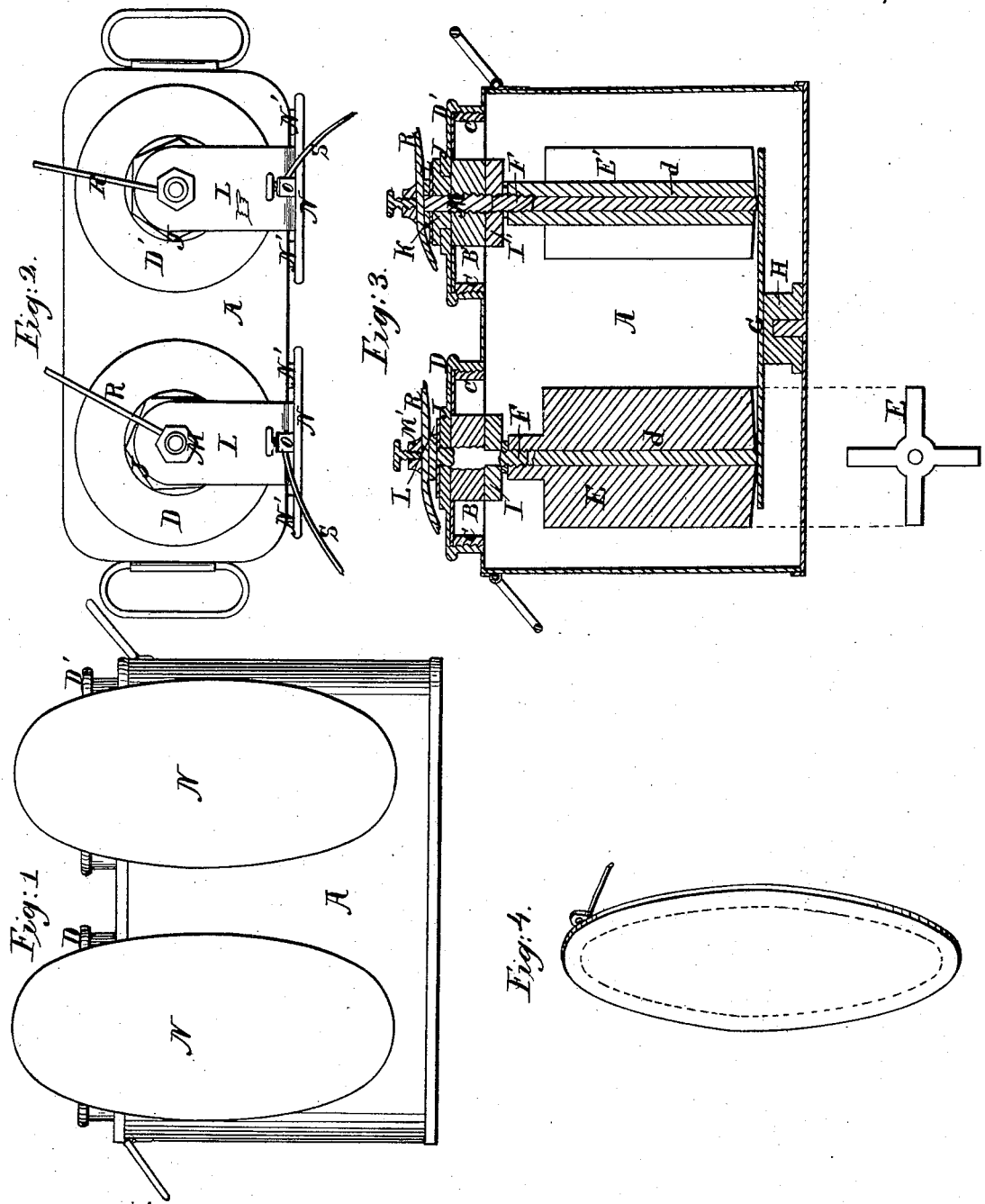
Witnesses;
J. H. Burridge
W. H. Burridge
Inventor;
Herman Fritz

United States Patent Office.

HERMAN FRITZ, OF CLEVELAND, OHIO.

Letters Patent No. 63,032, dated March 19, 1867.

---

IMPROVEMENT IN GALVANIC BATTERIES FOR REMEDIAL USES.

---

The Schedule referred to in these Letters Patent and making part of the same.

---

TO ALL WHOM IT MAY CONCERN:

Be it known that I, HERMAN FRITZ, of Cleveland, in the county of Cuyahoga, and State of Ohio, have invented certain new and useful improvements in Electro-Thermal Batteries; and I do hereby declare that the following is a full and complete description of the construction and operation of the same, reference being had to the accompanying drawings, making part of this specification, in which—

Figure 1 is a side view of the battery.
Figure 2 is a top view of the same.
Figure 3 is a transverse section.

Like letters of reference refer to like parts in the several views presented.

A, fig. 1, is the battery case, and is constructed of sheet copper, the outside of which is tinned, and the tinned surface then japanned or painted. In the top of the case are two circular holes, B B'. These holes are provided with raised collars or rims, C C, fig. 3, and over which are screwed the caps or covers, D D'. These covers are each provided with a packing gasket which, on the covers being screwed down upon the edge of the rim, makes a water and air-tight joint. E E' are the zincs or plates. These are connected to the caps D D' by the screws F. These screws are rigid in the caps and screwed into the zincs. By this means the plates can be easily replaced by others when worn out.

In the lower end of the zincs is a short brass or copper rod, indicated by the central lines d. This rod projects a little below the bottom of the zincs, and when they are in place they rest upon the copper bridge G, the ends of the rods only touching the bridge. These rods are for the purpose of connecting the zincs when their lower ends may have been eroded by the action of the battery. This bridge is insulated from the case by a pedestal, H. The position of the zincs, bridge, and the manner of securing them to the cover or caps is shown in fig. 3. I I' are insulating washers between the zincs and caps.

On the upper side of the cap is a boss-nut, J, figs. 2 and 3. K is an insulating washer placed between the raised boss-nut J and the projecting arm L. This insulating washer is placed on one cap only, this being the negative side of the battery, and is indicated by the ☞. These arms are fastened to the caps by the screws M M', which pass through them, the positive being screwed into the cap, the negative into the insulating washer I. The arms project beyond the side of the battery case, and terminate in a hook, to which are hung the foot-plate, N. These, as they hang down the side of the battery, are prevented from touching it by the insulators N'. O is a cup and finger-screw. R, the conducting wires.

Having thus designated the several parts of the battery, their relation and results are as follows:

As above stated, the outside of the battery case is tinned and japanned. By this means we obtain a greater current concentrated on the outer conductors. The box or case forms the positive pole of the battery. If this box was not japanned or covered by some non-conductor, the electricity would be diffused over its whole surface, and would thus, in some degree, weaken the tension of the current upon the plates. But by thus painting the box this diffusion is more or less restricted, and therefore the electric current is concentrated with greater energy upon the plates.

The two zincs or plates standing upon the bridge referred to are by this means connected, the bridge being the conducting medium. The zincs E, the positive end of the battery, is insulated from the cover D by the non-conducting washer I, the screw F being fastened in this washer, therefore it has no conducting connection with the cover, hence a complete insulation is secured to the zinc. Both the zincs are connected and insulated in the same way. The connection is made between the zinc E and the foot-plates, the negative end of the battery, by the screw M'. This screw is of sufficient length to reach down to and touch the end of the screw connecting the zinc to the insulating washer. It is also insulated from the boss-nut J by the insulating washer K, this washer being provided with a sleeve which is made to pass down through the washer J, making a non-conducting lining through which the screw passes, and thereby perfectly insulating the screw at the same time, it forms a straight and direct connection with the zinc; these, as above mentioned, being connected at the bottom by the bridge upon which they stand when in order for use.

The arm L, on the negative end of the battery, is insulated from the cover by the washer K, upon which it rests when screwed down, also by the insulators N. The foot-plates on the positive end of the battery are provided with similar insulators, but these are for the purpose of equalizing the heat, and not for insulating purposes. As before observed, the box is one pole of the battery. For the sole use of electric action the negative plate only is required to establish a circuit, but the patient having one foot warm by placing it on the negative plate, it is for the purpose of warming the other that the second or positive plate is introduced, and which may be used without the insulators. But if thus used without them, the plate will become much warmer than the other by its being more directly connected to the battery, hence the heat will not be applied as equally to both feet as it would be if the insulators were used, and thus equalizing the heat as applied to the feet of the patient.

The manner of charging the battery is as follows:

A certain quantity of hot water is poured into the case, a solution of sulphate of copper or other acid of the required strength is then added, and by its chemical action the temperature of the water is not only retained at the degree when first introduced, but is, in consequence, raised, and so continued at a higher temperature during the action of the solution, and by this means we obtain a continuous electric thermal current.

The patient, on being seated, places his feet upon the foot-plates N N, and therefrom receives the electro-current in a warm continuous flow. What is meant by a "warm continuous flow" is the heat obtained from the battery, which being warmed by the solution, produces a sensation of a warm current when the feet are placed upon the plates. Should the patient remove his feet from the plates, the electro-current would feel the same as from a cold battery. Should it be required to apply the current to any other part than the extremities, the foot-plates N are removed, and a pair having their surfaces covered with an insulating material, shown in fig. 4, placed in their stead, and the feet again placed upon them, while the electro-current is applied to any other part of the body by the conducting wires S S, which are secured to the plates by the cups O, and finger-screw above referred to; or the wire may be connected to the screws M M', and the current taken from thence and applied to any part of the body it may be required. A person lying down may use the battery by having it placed at his feet in the position shown in the drawing, or sitting, as above said; the case being water and air-tight, there is no danger of wasting or spilling the contents.

What I claim as my invention, and desire to secure by Letters Patent, is—

1. Air and water-tight case A, connecting bridge G, rods R, in combination with zincs E, and covers B, as arranged, and for the purpose set forth.

2. The insulating washer I, connecting screw F and M, and insulating washer K, as arranged in combination with the arm L, and foot-plates N, and insulator N', for the purpose and in the manner specified.

3. The screw M, insulating washer I, as arranged, in combination with the screw F, zinc E, and bridge G, for the purpose and in the manner described.

HERMAN FRITZ.

Witnesses:
   W. H. BURRIDGE,
   J. H. BURRIDGE.